United States Patent
DeFilippis

(10) Patent No.: US 9,991,758 B2
(45) Date of Patent: Jun. 5, 2018

(54) ELECTRIC MACHINE

(71) Applicant: SPAL AUTOMOTIVE S.r.l., Correggio (IT)

(72) Inventor: Pietro DeFilippis, Varazze (IT)

(73) Assignee: SPAL AUTOMOTIVE S.R.L., Correggio (IT)

(*) Notice: Subject to any disclaimer, the term of this patent is extended or adjusted under 35 U.S.C. 154(b) by 0 days. days.

(21) Appl. No.: 14/396,334

(22) PCT Filed: Apr. 23, 2013

(86) PCT No.: PCT/IB2013/053201
§ 371 (c)(1),
(2) Date: Oct. 22, 2014

(87) PCT Pub. No.: WO2013/160827
PCT Pub. Date: Oct. 31, 2013

(65) Prior Publication Data
US 2015/0084445 A1    Mar. 26, 2015

(30) Foreign Application Priority Data
Apr. 26, 2012 (IT) .............................. BO2012A0229

(51) Int. Cl.
*H02K 5/02* (2006.01)
*H02K 1/04* (2006.01)
(Continued)

(52) U.S. Cl.
CPC ................ *H02K 5/02* (2013.01); *H02K 1/04* (2013.01); *H02K 5/12* (2013.01); *H02K 11/33* (2016.01);
(Continued)

(58) Field of Classification Search
CPC . H02K 1/04; H02K 5/12; H02K 11/33; H02K 5/02
(Continued)

(56) References Cited

U.S. PATENT DOCUMENTS 4,591,750 A * 5/1986 Major ................... H02K 23/04
310/237
6,673,463 B1 * 1/2004 Onishi ..................... C08J 11/14
209/3
(Continued)

FOREIGN PATENT DOCUMENTS

| | | |
|---|---|---|
| JP | S52128903 A | 10/1977 |
| JP | H02118446 U | 9/1990 |

(Continued)

OTHER PUBLICATIONS

International Search Report dated Oct. 22, 2013 from counterpart PCT App No. PCT/IB2013/053201.
(Continued)

*Primary Examiner* — Naishadh Desai
(74) *Attorney, Agent, or Firm* — Shuttleworth & Ingersoll, PLC; Timothy J. Klima

(57) ABSTRACT

An electric machine comprises a sealed outer casing defined by a body and by a cover coupled to the body, a stator and a rotor the latter two being mounted inside the casing; the stator is of a wound type and comprises a core having at least two pole pieces and a plurality of windings each defined by a conductor wire wound in a plurality of coils around the pole pieces; the electric machine further comprises a plurality of plastic components located inside the casing and made of a plastic material whose moisture absorption at saturation is less than 0.8%, having insulating and/or supporting and/or cooling functions.

16 Claims, 2 Drawing Sheets

(51) Int. Cl.
 H02K 5/12   (2006.01)
 H02K 11/33  (2016.01)
 H02K 3/30   (2006.01)
 H02K 5/18   (2006.01)
 H02K 9/06   (2006.01)
 H02K 9/08   (2006.01)

(52) U.S. Cl.
 CPC ............. H02K 3/30 (2013.01); H02K 5/18
    (2013.01); H02K 9/06 (2013.01); H02K 9/08
            (2013.01); H02K 2205/09 (2013.01)

(58) Field of Classification Search
 USPC .................................................. 310/43, 233
 See application file for complete search history.

(56) References Cited

U.S. PATENT DOCUMENTS

| 7,888,828 | B2 | 2/2011 | Takahashi et al. | |
| 8,829,099 | B2 | 9/2014 | Kumazawa et al. | |
| 2002/0197523 | A1* | 12/2002 | Ohara | H01M 8/0221 |
| | | | | 429/514 |
| 2005/0162043 | A1* | 7/2005 | Higuchi | B41J 2/161 |
| | | | | 310/328 |
| 2006/0006564 | A1* | 1/2006 | Maldas | B27N 3/002 |
| | | | | 264/40.1 |
| 2008/0012436 | A1* | 1/2008 | Neal | H02K 1/04 |
| | | | | 310/54 |
| 2008/0038980 | A1* | 2/2008 | Tanaka | D04H 3/011 |
| | | | | 442/361 |
| 2009/0176923 | A1* | 7/2009 | Fujii | C08J 5/043 |
| | | | | 524/494 |
| 2011/0064958 | A1* | 3/2011 | Hirose | C23C 14/10 |
| | | | | 428/446 |

FOREIGN PATENT DOCUMENTS

| JP | H06172644 A | 6/1994 |
| JP | H11018353 A | 1/1999 |
| JP | 2004 001801 | 1/2004 |
| JP | 2005 088258 | 4/2005 |
| JP | 2007043829 A | 2/2007 |
| JP | 2009278751 A | 11/2009 |
| JP | 2010136596 A | 6/2010 |
| JP | 2011161605 A | 8/2011 |
| WO | WO2007007435 A1 | 1/2007 |
| WO | 2009/019562 | 2/2009 |
| WO | 2009/019563 | 2/2009 |

OTHER PUBLICATIONS

Japanese Office Action dated Nov. 29, 2016 for counterpart Japanese Application No. 2015-507642.

Japanese Office Action dated Aug. 15, 2017 for counterpart Japanese Application No. JP2015-507642.

* cited by examiner

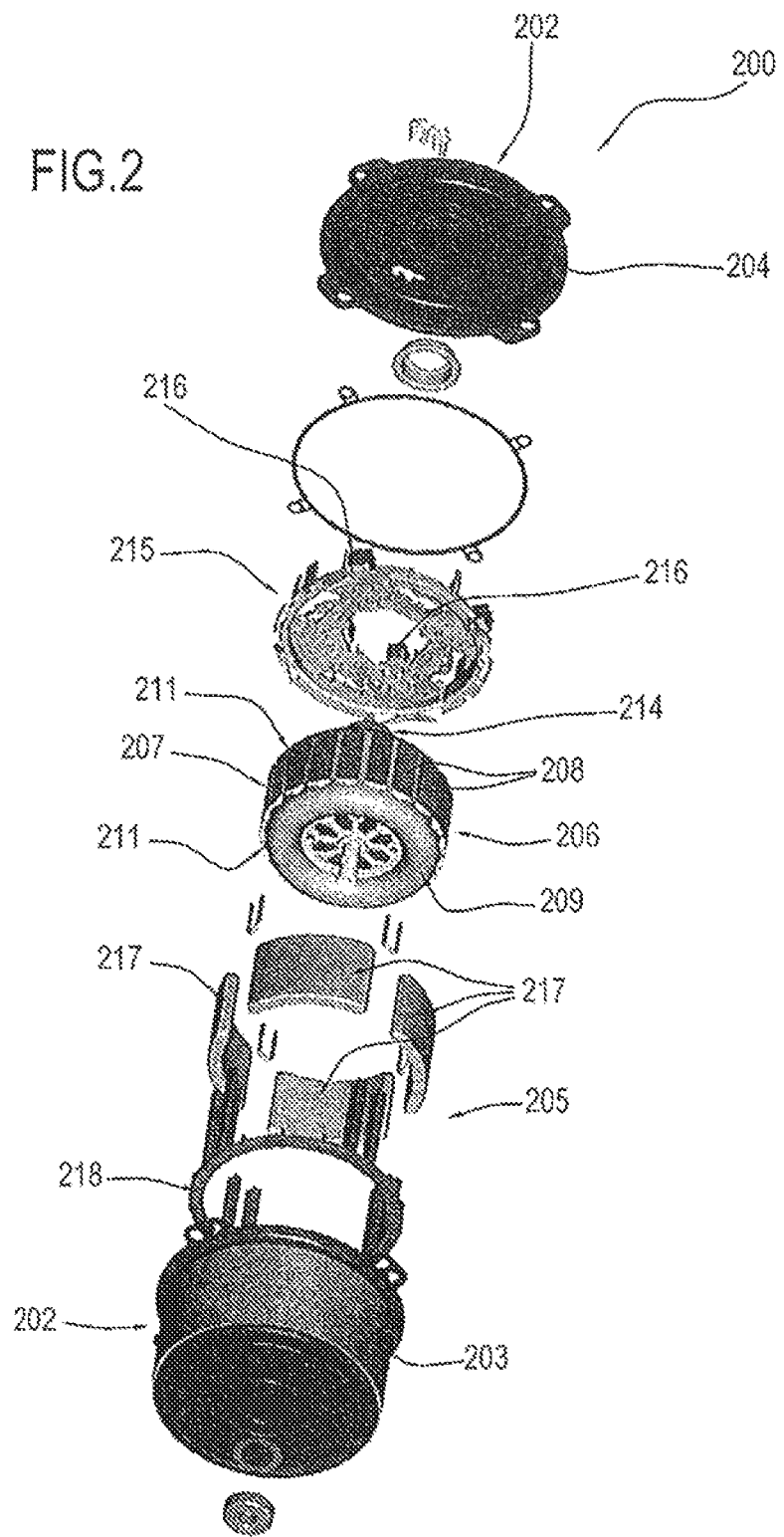

ELECTRIC MACHINE

This application is the National Phase of International Application PCT/IB2013/053201 filed Apr. 23, 2013 which designated the U.S. and that International Application was published under PCT Article 21(2) in English.

This application claims priority to Italian Patent Application No. BO2012A000229filed Apr. 26, 2012, which application is incorporated by reference herein.

TECHNICAL FIELD

This invention relates to an electric machine and in particular to a rotary electric machine of the sealed type.

BACKGROUND ART

These machines have a substantially cylindrical outer casing defined by body which is hermetically sealed by a cover by means of rivets from which protrude the connection terminals through which the machine itself is powered.

A rotary electric machine comprises a stator, rigidly connected to the body, and a rotor, rotatably connected thereto.

Rotary electric machines of particular relevance include brushless motors and direct current motors.

A brushless motor has a wound stator and a permanent magnet rotor, whereas a direct current motor has a permanent magnet stator and a wound rotor, called armature.

A power supply circuit for the motor is housed in the casing and is powered through the above mentioned connection terminals.

The aforementioned motors are used especially in the automotive field for driving centrifugal ventilators, double or single, or axial.

The armature or the wound stator comprises a core and a plurality of windings around two or more pole pieces of the core. The windings are insulated from the pole pieces by interposed plastic insulators.

Generally speaking, a fan of plastic material, set in rotation by the rotor, may be provided inside the casing to produce a cooling air flow inside the electric machine.

The Applicant, who has developed numerous solutions for heavy-duty, sealed electric machines—for example, see documents WO2009019563 and WO2009019562 —has identified an unexpected problem hitherto unknown in the trade.

More specifically, during a test on centrifugal ventilators running at 100° C. for 4 hours, the outer casings opened and the cover and body came apart.

Also, during a similar test on nine single-shaft motors, five casings opened, with covers and casing bodies coming apart.

DISCLOSURE OF THE INVENTION

In this context, the main purpose of the invention is to propose an electric machine, in particular a rotary electric machine of the sealed type which is free of the above mentioned disadvantages.

The aim of this invention is to provide a rotary electric machine which is not subject to unwanted opening of the outer casing, with cover and body coming apart.

Another aim of the invention is to provide an improved rotary electric machine that is more dependable than those known from the prior art.

The stated technical purpose and at least the aims specified are substantially achieved by an electric machine where the plastic components having insulating and/or supporting and/or cooling functions inside the casing are made of a plastic material whose moisture absorption at saturation is less than 0.8%.

Indeed, the inventor has found that the materials normally used, for example PA66 (polyamide), give off steam in the casing during heavy-duty operation.

The presence of steam is due to the water which is absorbed by the material the plastic components are made of and which is given off in the form of vapour when the interior of the motor exceeds certain temperatures.

In sealed machines relevant to this specification, the steam has no way of escape and thus the pressure inside the casing increases until the cover and the body are forced apart.

The use of a material whose moisture absorption at saturation is less than 0.8% guarantees that water in the plastic components inside the motor is absent or present in negligible quantities. That means, in practice, that steam is not formed when the motor operates under very heavy-duty conditions, thus preventing the cover and the body from coming apart.

BRIEF DESCRIPTION OF DRAWINGS

Other features and advantages of the invention are more apparent in the detailed description below, with reference to a non-limiting and non-exclusive preferred embodiment of a rotary electric machine, as illustrated in the accompanying drawings, in which:

FIG. 2 is a schematic exploded perspective view, with some parts cut away for greater clarity, of a second electric machine according to the invention.

DETAILED DESCRIPTION OF PREFERRED EMBODIMENTS OF THE INVENTION

Figure 1:
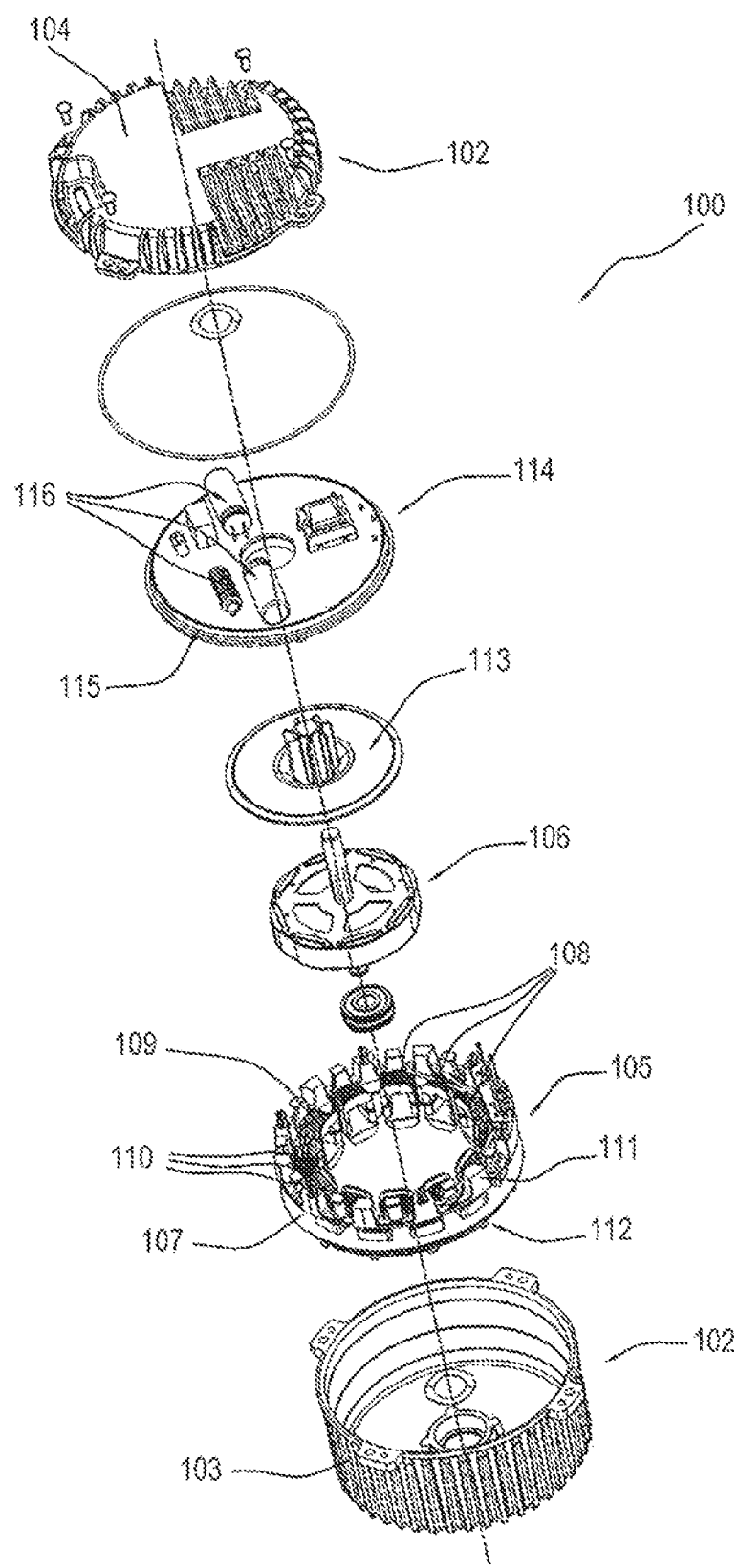
FIG. 1 is a schematic exploded perspective view, with some parts cut away for greater clarity, of a rotary electric machine according to this invention.

With reference to FIGS. 1 and 2, the numerals 100 and 200 denote, respectively, two electric machines according to the invention.

More specifically, FIG. 1 shows a brushless motor 100, while FIG. 2 shows a direct current or commutator motor 200.

The motors 100 and 200 are of substantially known type and therefore their features are described and illustrated only insofar as necessary for understanding this invention.

The motors 100 and 200 respectively comprise a sealed outer casing 102, 202 defined by a body 103, 203 and a cover 104, 204 coupled to the corresponding body 103, 203.

The casings 102 and 202 respectively house a stator 105, 205 and a rotor 106, 206 (armature).

In the embodiment illustrated in FIG. 1, that is, in the brushless motor 10 the rotor 106 is of the permanent magnet type, while the stator 105 is of the wound type.

The motor 100 is of the type illustrated and described for example in application WO2009019562 which is incorporated herein by reference for completeness of description.

The stator 105 comprises a core 107 which has a plurality of pole pieces 108, twelve in the example illustrated.

The stator 105 comprises a plurality of windings 109, each defined by a conductor wire wound in a plurality of coils 110 around the pole pieces 108.

As illustrated, the stator 105 comprises a first and a second insulator 111, 112, made of a plastic material and positioned between the windings 109 and the core 107.

In the configuration illustrated, the motor 100 comprises a fan 113, preferably made of plastic, integral with the rotor 106.

In use, the fan 113 produces a circulation of cooling air inside the motor 100.

As illustrated, the motor 100 comprises an electronic module 114 for driving the motor 100 and mounted inside the casing 102.

The electronic module 114 comprises a support 115 of plastic material and a plurality of electronic components, some of which are illustrated, denoted by the reference numeral 116, and which are mounted on the support 115.

In the embodiment illustrated in FIG. 2, that is, in the direct current or commutator motor 200, the armature 206 is of the wound type with commutator, while the stator 206 is of the permanent magnet type.

An example of a direct current motor is illustrated and described in application WO2009019563 which is incorporated herein by reference for completeness of description.

The armature 206 comprises a core 207 which has a plurality of pole pieces 208, twenty in the example illustrated.

The armature 206 comprises a plurality of windings schematically illustrated and labelled 209, each defined by a conductor wire wound in a plurality of coils around the pole pieces 208.

As illustrated, the armature 206 comprises a first and a second insulator 211, 212, made of a plastic material and positioned between the windings 209 and the core 207.

The windings 209 are suitably connected in known manner to plates, not illustrated, which define the power commutator 214 of the rotor 206.

As illustrated, the motor 200 comprises, inside the casing 202, a brush holder 215, made of a plastic material, for supporting brushes 216 which define the contacts which slide on the commutator 214.

Looking in more detail at the stator 205, it may observed that the latter comprises a plurality of magnets 217, four in the example illustrated, and a support 218, made of a plastic material, for the magnets 217 and commonly known as "magnet holder".

The support 218 keeps the magnets 217 in position inside the body 203 for the correct operation of the motor 200.

According to this invention, one or more of the plastic components 111, 112, 113, 115 or 211, 212, 215, 218, are made of a plastic material whose moisture absorption at saturation, determined according to ISO62, is less than 0.8%.

Advantageously, the moisture absorption value can be calculated according to different standards or estimated in a different way, for example at equilibrium or after immersion for 24 hours.

Preferably, one or more of the plastic components 111, 112, 113, 115 or 211, 212, 215, 218, are made of a plastic material whose moisture absorption at saturation is less than 0.5%, determined according to ISO62.

In other words, in the brushless motor 100, the first and the second insulator 111 and 112 and/or the fan 113 and/or the support 115, are made of a plastic material whose moisture absorption at saturation is less than 0.8%, preferably, less than 0.5%.

Preferably, the first and the second insulator 111 and 112 and/or the fan 113 and/or the support 115, are made of a plastic material whose moisture absorption at saturation is 0.3% such as, for example, PBT—polybutylene terephthalate—or tough PBT.

Alternatively, the first and the second insulator 111 and 112 and/or the fan 113 and/or the support 115, are made of a plastic material whose moisture absorption at saturation is 0.7%, such as, for example, PET—polyethylene terephthalate—or tough PET.

Alternatively, the first and the second insulator 111 and 112 and/or the fan 113 and/or the support 115, are made of a plastic material whose moisture absorption at saturation is 0.3%, such as, for example, PCT—poly(cyclohexylene dimethylene terephthalate).

Preferably, also, the plastic material of one or more of the plastic components 111, 112, 113 and 115 of the brushless motor 100 comprises a reinforcing material, for example fibreglass, in a percentage of between 30 and 35.

With reference to the electric commutator machine 200, it may be observed that, in practice, the first and the second insulator 211 and 212 and/or the brush holder 215 and/or the support 218 for the magnets, are made of a plastic material whose moisture absorption at saturation is less than 0.8%, preferably, less than 0.5%.

Preferably, the first and the second insulator 211 and 212 and/or the brush holder 215 and/or the support 218 for the magnets, are made of a plastic material whose moisture absorption at saturation is 0.3%, such as, for example, PBT or tough PBT.

Alternatively, the first and the second insulator 211 and 212 and/or the brush holder 215 and/or the support 218 for the magnets, are made of a plastic material whose moisture absorption at saturation is 0.7%, such as, for example, PET or tough PET.

Alternatively, the first and the second insulator 211 and 212 and/or the brush holder 215 and/or the support 218 for the magnets, are made of a plastic material whose moisture absorption at saturation is 0.3%, such as, for example, PCT.

Preferably, also, the plastic material of one or more of the plastic components 211, 212, 215 e 218 of the commutator machine 200 comprises a reinforcing material, for example fibreglass, in a percentage of between 30 and 35.

The invention has important advantages.

The use of a material whose moisture absorption at saturation is less than 0.8%, that is to say, the use of material also known as "non-hygroscopic" material inside a sealed motor prevents unwanted opening of the cover relative to the body when the temperature inside the motor is very high.

Electric machines made in this way are thus more dependable and suitable for working under even heavier duty conditions compared to prior art machines.

The invention claimed is:

1. An electric machine comprising:
   a sealed outer casing defined by a body and by a cover coupled to the body, the sealed outer casing including an interior sealed from an exterior of the sealed outer casing,
   a stator and a rotor mounted in the interior of the sealed outer casing,
   at least one chosen between the stator and the rotor comprising a core having at least two pole pieces and a plurality of windings each defined by a conductor wire wound in a plurality of coils around the pole pieces,
   a plurality of plastic components positioned in the interior of the sealed outer casing and which have at least one chosen from insulating, supporting and cooling functions, wherein the plastic components are made of a plastic material whose moisture absorption at saturation is less than 0.8 %;

the interior of the sealed outer casing having a reduced production of steam due to the plastic components being made of a plastic material whose moisture absorption at saturation is less than 0.8 % as compared to PA66 polyamide.

2. The electric machine according to claim 1, wherein the plastic components are made of a plastic material whose moisture absorption at saturation is less than 0.5 %.

3. The machine according to claim 1, wherein the plastic material the plastic components are made of comprises PBT.

4. The machine according to claim 1, wherein the plastic material the plastic components are made of comprises tough PBT.

5. The machine according to claim 1, wherein the plastic material the plastic components are made of comprises PET.

6. The machine according to claim 1, wherein the plastic material the plastic components are made of comprises tough PET.

7. The machine according to claim 1, wherein the plastic material the plastic components are made of comprises PCT.

8. The machine according to claim 1, wherein the plastic material the plastic components are made of comprises a reinforcing material in a percentage of between 30 and 35.

9. The machine according to claim 1, comprising a wound stator and wherein the plastic components form at least one chosen from at least one insulator interposed between the core and the windings of the stator, a fan inside the casing and integral with the rotor, and a support for an electronic module for driving the machine, the machine being a brushless, permanent magnet electric machine.

10. The machine according to claim 1, comprising a wound rotor and a permanent magnet stator and wherein the plastic components form at least one chosen from at least one insulator interposed between the core and the windings of the rotor, a brush holder inside the sealed outer casing, and a support for the magnets, the machine being an electric commutator machine.

11. The machine according to claim 9, wherein the plastic material the plastic components are made of comprises PBT.

12. The machine according to claim 9, wherein the plastic material the plastic components are made of comprises tough PBT.

13. The machine according to claim 9, wherein the plastic material the plastic components are made of comprises PET.

14. The machine according to claim 9, wherein the plastic material the plastic components are made of comprises tough PET.

15. The machine according to claim 9, wherein the plastic material the plastic components are made of comprises PCT.

16. The machine according to claim 3, wherein the PBT has a substantially reduced tensile strain at break and impact strength than PA66-GF33.

\* \* \* \* \*